US012390753B2

(12) United States Patent
Kitao et al.

(10) Patent No.: US 12,390,753 B2
(45) Date of Patent: Aug. 19, 2025

(54) APPARATUS AND METHOD FOR MANUFACTURING FILTER

(71) Applicant: DAIKIN INDUSTRIES, LTD., Osaka (JP)

(72) Inventors: Hiroyuki Kitao, Osaka (JP); Yusuke Matsumoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 55 days.

(21) Appl. No.: 18/217,374

(22) Filed: Jun. 30, 2023

(65) Prior Publication Data

US 2024/0024806 A1    Jan. 25, 2024

(30) Foreign Application Priority Data

Jul. 19, 2022 (JP) ................................ 2022-114670
Mar. 27, 2023 (JP) ................................ 2023-049829

(51) Int. Cl.
| | | |
|---|---|---|
| B01D 46/00 | (2022.01) | |
| B01D 46/52 | (2006.01) | |
| B31F 1/26 | (2006.01) | |
| B65H 20/06 | (2006.01) | |

(52) U.S. Cl.
CPC ....... B01D 46/0001 (2013.01); B01D 46/521 (2013.01); B31F 1/26 (2013.01); B65H 20/06 (2013.01); *B01D 2279/50* (2013.01); *B65H 2404/261* (2013.01); *B65H 2513/10* (2013.01); *B65H 2701/11231* (2013.01)

(58) Field of Classification Search
CPC .............. B01D 46/0001; B01D 46/521; B01D 2279/50; B31F 1/26; B65H 20/06; B65H 2404/261; B65H 2513/10; B65H 2701/11231
See application file for complete search history.

(56) References Cited

U.S. PATENT DOCUMENTS

| | | | | |
|---|---|---|---|---|
| 767,883 A | * | 8/1904 | Grafton ................. | B21D 13/04 72/196 |
| 3,673,846 A | * | 7/1972 | Levington ............ | B21D 53/025 72/405.06 |

(Continued)

FOREIGN PATENT DOCUMENTS

WO     2004/060521 A2    7/2004

*Primary Examiner* — Dariush Seif
(74) *Attorney, Agent, or Firm* — GLOBAL IP COUNSELORS, LLP

(57) ABSTRACT

An apparatus is usable to manufacture a filter. The apparatus includes a pleats-forming unit, a first belt part, a second belt part, and a controller. The pleats-forming unit delivers a filter substrate in a first direction and then successively folds the filter substrate into alternate mountains and valleys. The first belt part is disposed downstream of the pleats-forming unit in the first direction. The first belt part contacts with the mountains and valleys of the filter substrate to compress the mountains and valleys of the filter substrate in the first direction. The second belt part is disposed downstream of the first belt part in the first direction. The second belt part pulls the mountains and valleys of the filter substrate in the first direction to form a predetermined pitch between each adjacent pair of the mountains or valleys. The control unit controls a traveling speed of the second belt part.

13 Claims, 10 Drawing Sheets

(56) References Cited

U.S. PATENT DOCUMENTS

| | | | | |
|---|---|---|---|---|
| 3,850,018 A * | 11/1974 | Drosnin | B21D 53/08 | 72/186 |
| 3,988,917 A * | 11/1976 | Mykolenko | B21D 13/04 | 72/196 |
| 3,993,425 A * | 11/1976 | Dunn | B31F 1/305 | 493/463 |
| 4,012,932 A * | 3/1977 | Gewiss | B31D 5/0082 | 72/190 |
| 4,181,070 A * | 1/1980 | Robbins | B31D 5/0082 | 493/379 |
| 4,280,352 A * | 7/1981 | Cowell | B21D 13/04 | 72/186 |
| 4,288,278 A * | 9/1981 | Akao | B29C 53/28 | 156/204 |
| 4,507,948 A * | 4/1985 | Wallis | B23D 33/006 | 72/185 |
| 4,798,575 A * | 1/1989 | Siversson | B65H 45/20 | 493/347 |
| 4,940,500 A * | 7/1990 | Tadokoro | B01D 29/072 | 156/227 |
| 5,389,175 A * | 2/1995 | Wenz | B65H 20/00 | 493/347 |
| 5,503,547 A * | 4/1996 | Funahashi | B31F 1/245 | 425/336 |
| 5,819,575 A * | 10/1998 | Kobayashi | B21D 53/04 | 72/379.6 |
| 6,022,305 A * | 2/2000 | Choi | D06J 1/04 | 493/463 |
| 6,159,318 A * | 12/2000 | Choi | B01D 33/27 | 156/181 |
| 6,230,776 B1 * | 5/2001 | Choi | B01D 33/27 | 156/441 |
| 6,286,353 B1 * | 9/2001 | Bruck | B01J 35/56 | 72/379.6 |
| 6,521,011 B1 * | 2/2003 | Sundet | B01D 46/523 | 55/497 |
| 7,465,267 B2 * | 12/2008 | Goodrich | B65H 45/20 | 493/434 |
| 7,896,941 B2 * | 3/2011 | Choi | B01D 39/163 | 55/528 |
| 8,661,670 B2 * | 3/2014 | Bruck | F01N 3/2821 | 72/379.6 |
| 9,808,753 B2 * | 11/2017 | Lise | B31D 5/0082 | |
| 11,660,834 B2 * | 5/2023 | Fiello | B65H 45/28 | 493/369 |
| 2004/0118771 A1* | 6/2004 | Schukar | B01D 46/527 | 210/493.4 |
| 2005/0252182 A1* | 11/2005 | Golden | B01D 46/527 | 55/521 |
| 2006/0005518 A1* | 1/2006 | Duffy | B31D 5/0082 | 55/497 |
| 2006/0283162 A1* | 12/2006 | Dent | B01D 46/523 | 55/499 |
| 2010/0064491 A1* | 3/2010 | Dumas | D04H 1/64 | 28/100 |
| 2024/0024806 A1* | 1/2024 | Kitao | B65H 20/06 | |

* cited by examiner

AMOUNT OF PLEATS

TOP
LEFT ← → RIGHT
BOTTOM

AMOUNT OF PLEATS

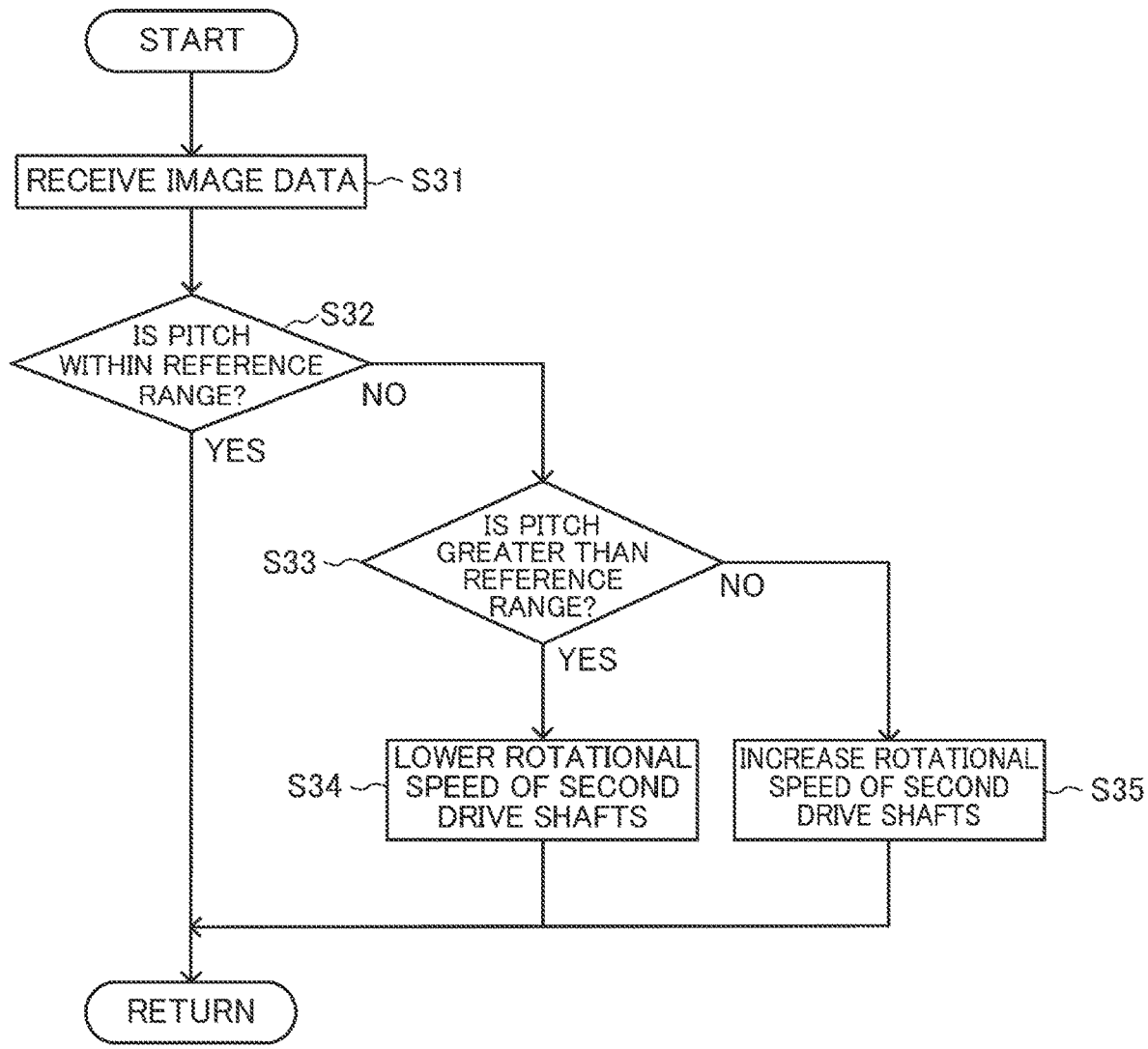

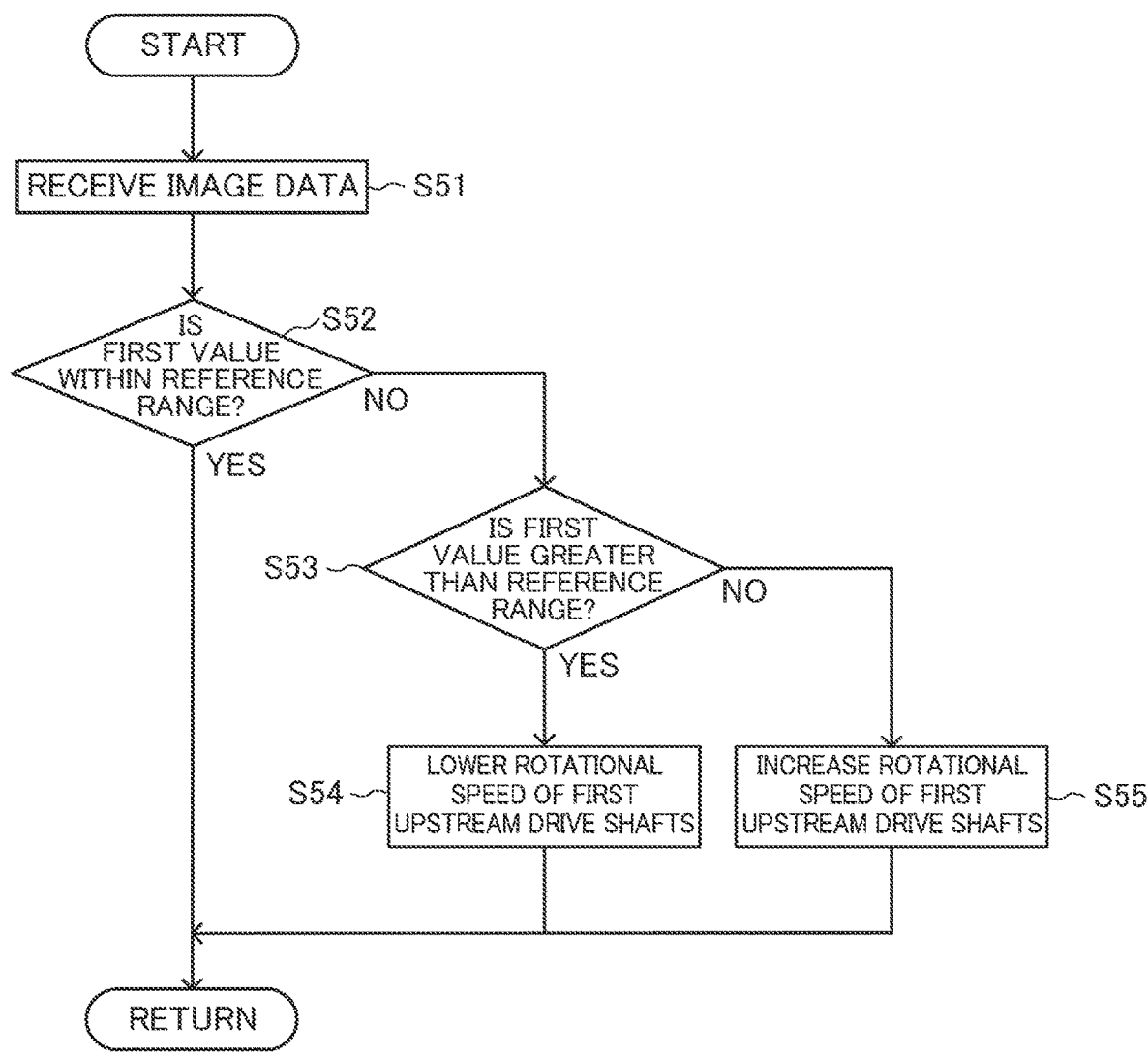

APPARATUS AND METHOD FOR MANUFACTURING FILTER

CROSS-REFERENCE TO RELATED APPLICATIONS

This application claims priority under 35 U.S.C. § 119(a) to Japanese Patent Applications No. 2022-114670, filed in Japan on Jul. 19, 2022 and 2023-049829, filed in Japan on Mar. 27, 2023. the entire contents of which are hereby incorporated herein by reference.

BACKGROUND

Technical Field

The present disclosure relates to an apparatus and method for manufacturing a filter.

Background Art

WO2004/060521 discloses a filter manufacturing apparatus that pleats a filter sheet that will serve as a filter. This filter manufacturing apparatus includes a pleater, which creases the filter sheet to create alternate mountain and valley folds. As a result, pleats are formed.

SUMMARY

A first aspect is directed to an apparatus for manufacturing a filter. The apparatus includes a pleats-forming unit, a first belt part, a second belt part, and a controller. The pleats-forming unit is configured to deliver a filter substrate in a first direction and then to successively fold the filter substrate into alternate mountains and valleys. The first belt part is disposed downstream of the pleats-forming unit in the first direction. The first belt part is configured to contact with the mountains and valleys of the filter substrate to compress the mountains and valleys of the filter substrate in the first direction. The second belt part is disposed downstream of the first belt part in the first direction. The second belt part is configured to pull the mountains and valleys of the filter substrate in the first direction to form a predetermined pitch between each adjacent pair of the mountains or valleys. The control unit is configured to control a traveling speed of the second belt part.

BRIEF DESCRIPTION OF THE DRAWINGS

FIG. 10 is a flowchart showing a second feedback control.

FIG. 14 is a flowchart showing a third feedback control.

DETAILED DESCRIPTION OF EMBODIMENT(S)

An embodiment of the present disclosure will be described with reference to the drawings. The following embodiments are merely exemplary ones in nature, and are not intended to limit the scope, application, or uses of the invention. Features of the embodiments, variations, and other examples described below can be combined or partially substituted within the range where the present invention can be embodied.

(1) General Configuration of Apparatus For Manufacturing Filter

Figure 1:
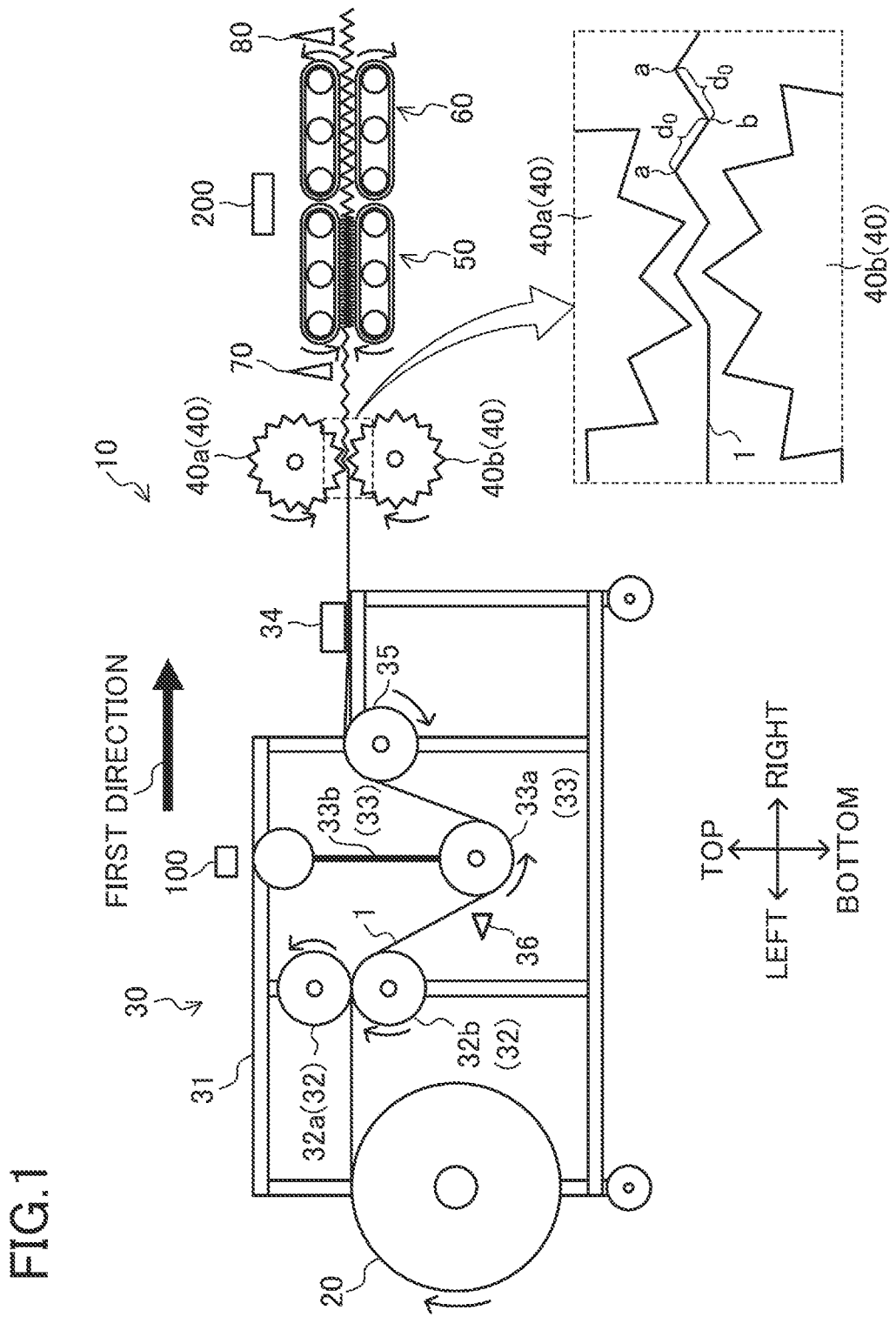
FIG. 1 is a schematic diagram illustrating a configuration of a filter manufacturing apparatus according to an embodiment.

As illustrated in FIG. 1, a filter manufacturing apparatus (10) according to this embodiment is configured to pleat a filter substrate (1). A filter manufactured by the filter manufacturing apparatus (10) is used as a household or business use filter to be attached to an outlet of, for example a duct air-conditioning system. The filter manufacturing apparatus (10) includes a supply roll (20), an uncoiler unit (30), star gears (40), a first belt part (50), and a second belt part (60), a first sensor (70), and a second sensor (80). The supply roll (20), the uncoiler unit (30), the star gears (40), the first belt part (50), and the second belt part (60) are arranged in this order in the first direction. The first direction is a direction indicated by the thick arrow illustrated in FIG. 1 (the right direction in FIG. 1). In the following description, the term "upstream" means the upstream direction along the first direction, and the term "downstream" means the downstream direction along the first direction. The terms "top," "upper," "bottom," "lower," "left," and "right" indicate directions when the filter manufacturing apparatus (10) is viewed from the front (see FIG. 1). The arrows indicated by the curves in each figure indicate the directions in which various components move.

(1-1) Supply Roll

The filter substrate (1) in the form of a sheet is wound around the supply roll (20). The filter substrate (1) of this embodiment is a filter material including a wire of aluminum or steel bonded to a nonwoven fabric. One end of the filter substrate (1) is fed in the first direction through the rotation of the supply roll (20). The filter substrate (1) fed from the supply roll (20) is supplied to the uncoiler unit (30).

(1-2) Uncoiler Unit

The uncoiler unit (30) adjusts the tension of the filter substrate (1). The uncoiler unit (30) is disposed upstream of the star gears (40). Specifically, the uncoiler unit (30) adjusts the tension of the filter substrate (1) supplied from the supply roll (20) to the star gears (40). The uncoiler unit (30) is an example of an adjuster (30).

The uncoiler unit (30) includes a frame (31), feeding rollers (32), a dancer roller (33), a weight (34), a position sensor (36), and a first control unit (100). The frame (31) is provided with the feeding rollers (32), the dancer roller (33), and the weight (34) arranged in this order in the first direction. The frame (31) is provided with a support roller (35) between the dancer roller (33) and the weight (34). The support roller (35) supports the lower surface of the filter substrate (1) that travels in the first direction.

(1-2-1) Feeding Roller

The feeding rollers (32) include a first roller (32a) and a second roller (32b). The first and second rollers (32a) and (32b) are arranged adjacent to each other in the top-to-bottom direction such that a filter surface of the filter substrate (1) is interposed between their roller surfaces. The filter substrate (1) fed from the supply roll (20) in the first direction is interposed between the feeding rollers (32) in order to be further delivered in the first direction. The second roller (32b) is disposed below the first roller (32a), and is located at generally the same height position as the support roller (35). The first and second rollers (32a) and (32b) are controlled to have the same rotational speed. The first control unit (100) controls the rotational speed of the rollers (32a, 32b).

(1-2-2) Dancer Roller

The dancer roller (33) regulates the tension of the filter substrate (1). Specifically, the dancer roller (33) includes a third roller (33a) and a support (33b).

The support (33b) is a member that supports the third roller (33a). Specifically, the upper end of the support (33b) is fixed to the frame (31). The lower end of the support (33b) fixes the third roller (33a). As can be seen, the support (33b) is provided to suspend the third roller (33a).

The third roller (33a) applies a constant tension to the filter substrate (1) to reduce the slack in the filter substrate (1). Specifically, the third roller (33a) has a roller surface in contact with the upper surface of the filter substrate (1). The third roller (33a) moves along the top-to-bottom direction with its optional height position as a reference position. The height position of the third roller (33a) is sensed by the position sensor (36). If the third roller (33a) has moved downward from the reference position, the rotational speed of the feeding rollers (32) is reduced to move the third roller (33a) upward to the reference position. On the other hand, if the third roller (33a) has moved upward from the reference position, the rotational speed of the feeding rollers (32) is increased to move the third roller (33a) downward to the reference position. As can be seen, maintaining the third roller (33a) at the reference position allows a constant tension to be applied to the filter substrate (1).

(1-2-3) Position Sensor

The position sensor (36) senses the height position of the third roller (33a) of the dancer roller (33). The position sensor (36) is, for example, an optical sensor. The position sensor (36) transmits a signal indicating the height position of the third roller (33a) to the first control unit (100).

(1-2-4) First Control Unit

Figure 2:
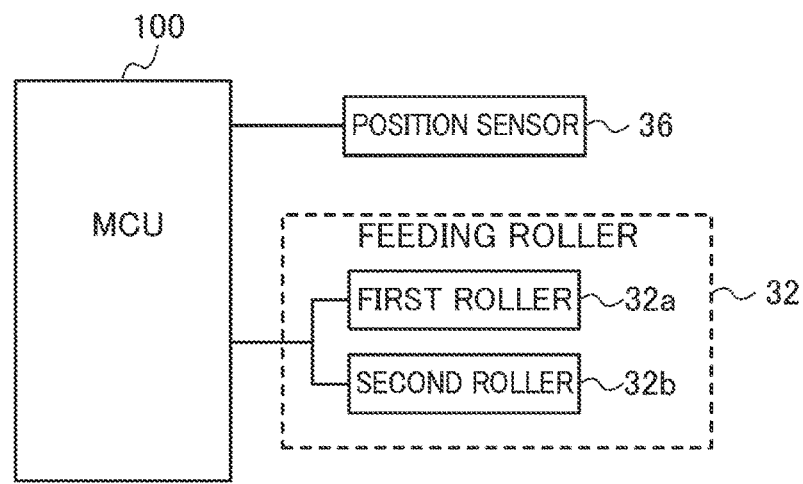
FIG. 2 is a block diagram illustrating the relationship between a first control unit and various components of an uncoiler unit.

As shown in FIG. 2, the first control unit (100) includes a micro control unit (MCU), an electric circuit, and an electronic circuit. The MCU includes a central processing unit (CPU), a memory, and a communications interface. The memory stores various programs to be executed by the CPU.

The first control unit (100) controls various components of the uncoiler unit (30). Specifically, the first control unit (100) regulates the rotational speed of the rollers (32a, 32b) serving as the feeding rollers (32), based on the signal indicating the height position of the third roller (33a) and received from the position sensor (36). The first control unit (100) performs a tension control to control the tension of the filter substrate (1). As can be seen, the tension control is performed by controlling the amount of the filter substrate (1) to be fed. The tension control will be described later.

(1-2-5) Weight

As illustrated in FIG. 1, the weight (34) is a weight that regulates the tension of the filter substrate (1) transferred from the dancer roller (33) thereto via the support roller (35).

(1-3) Star Gear

As illustrated in FIG. 1, the star gears (40) deliver the filter substrate (1) in the first direction, and then successively fold the filter substrate (1) into alternate mountains and valleys. Specifically, the star gears (40) include a first gear (40a) and a second gear (40b) as a pair of gears. The first and second gears (40a) and (40b) each have an axis extending in the front-to-back direction of the plane of the paper of FIG. 1, and are arranged in a line in the top-to-bottom direction such that teeth of the first gear (40a) mesh with those of the second gear (40b). The star gears (40) are arranged with the filter substrate (1) interposed therebetween, and mesh with each other to form the mountains and valleys of the filter substrate (1). The first gear (40a) is disposed above the second gear (40b). The star gears (40) are an example of a pleats-forming unit (40).

As illustrated in a partially enlarged view of the star gears in FIG. 1 (surrounded by the dashed line), the filter substrate (1) is sandwiched between the grooves of the first gear (40a) and the teeth of the second gear (40b) to form the mountains. The filter substrate (1) is sandwiched between the teeth of the first gear (40a) and the grooves of the second gear (40b) to form the valleys. As can be seen, the filter substrate (1) is pleated. Here, the distances do between the crests a of the mountains and the adjacent troughs b of the valleys formed by the star gears (40) are constant.

(1-4) First Belt Part

Figure 3:
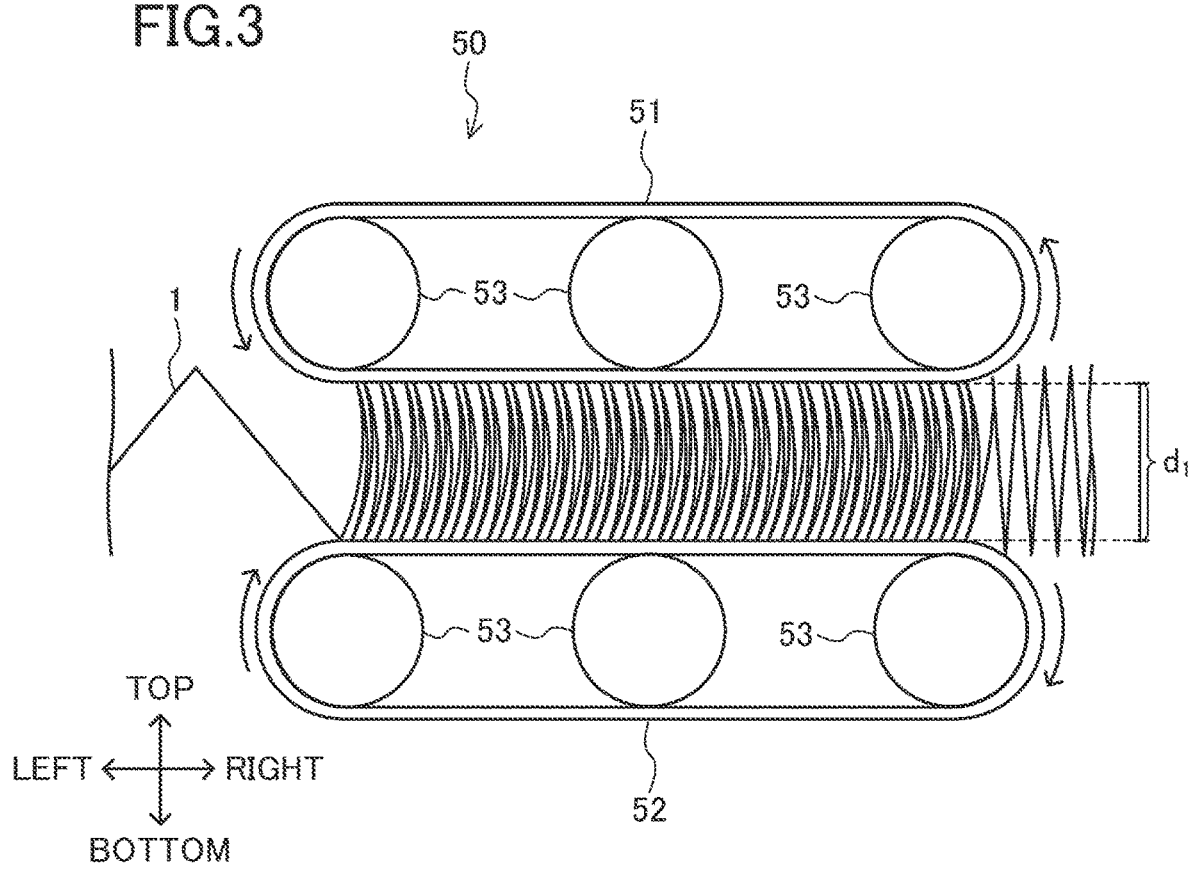
FIG. 3 illustrates how a first belt part compresses a filter substrate.

As illustrated in FIGS. 1 and 3, the first belt part (50) is disposed downstream of the star gears (40) in the first direction. The first belt part (50) is in contact with each of the mountains and valleys of the filter substrate (1) to compress the mountains and valleys of the filter substrate (1) in the first direction. The details will be described below.

The first belt part (50) includes a pair of belts (51, 52). The first belt part (50) includes a first upper belt (51) and a first lower belt (52). The first upper belt (51) and the first lower belt (52) are arranged in a line in the top-to-bottom direction such that their traveling surfaces face each other. The distance $d_1$ between the traveling surface of the first upper belt (51) and the traveling surface of the first lower belt (52) is slightly shorter than the distance $d_0$. In the following description, the inside of the first belt part (50) refers to a space between the first upper belt (51) and the first lower belt (52).

The first upper belt (51) and the first lower belt (52) are configured as elastic members of a resin or any other similar material. The first upper belt (51) and the first lower belt (52) have an annular shape. A plurality of first drive shafts (53) with an axis extending in the front-to-back direction of the plane of the paper of FIG. 3 are provided inside each of the first upper belt (51) and the first lower belt (52).

The first drive shafts (53) allow the traveling surfaces of the first upper belt (51) and the first lower belt (52) facing each other to travel in the first direction. The first drive shafts (53) rotate so that the traveling surfaces of the first upper belt (51) and the first lower belt (52) travel at the same traveling speed. The rotational speed of each first drive shaft (53) is regulated so that the traveling speed of the first belt part (50) is lower than the speed of the filter substrate (1) entering the inside of the first belt part (50).

Next, compression of the mountains and valleys of the filter substrate (1) will be described. The distance $d_1$ between the traveling surface of the first upper belt (51) and the traveling surface of the first lower belt (52) is slightly shorter than the distance $d_0$ (distance $d_1$<distance $d_0$). Thus, the crests a of the mountains of the filter substrate (1) move in the first direction while being maintained in contact with the traveling surface of the first upper belt (51) inside the first belt part (50). Likewise, the troughs b of the valleys of the filter substrate (1) move in the first direction while being maintained in contact with the traveling surface of the first lower belt (52).

Here, the rotational speed of the first drive shafts (53) is lower than the rotational speed of the star gears (40). Thus, the speed of the filter substrate (1) entering the inside of the first belt part (50) is higher than the traveling speed of the traveling surfaces of the first belt part (50). Thus, the filter substrate (1) entering the inside of the first belt part (50) moves in the first direction such that the first upper belt (51) and the first lower belt (52) make the adjacent mountains sequentially overlap each other in a folding manner, and also make the adjacent valleys sequentially overlap each other in a folding manner.

As described above, the compression means that the adjacent mountains of the filter substrate (1) overlap each other in a folding manner, and that the adjacent valleys thereof overlap each other in a folding manner. In other words, the compression means that the distances between each adjacent pair of the mountains, and between each adjacent pair of the valleys, of the filter substrate (1) are shortened. Since the distance $d_1$ is shorter than the distance $d_0$ (distance $d_1$<distance $d_0$), oblique surfaces (filter surfaces) of the mountains and valleys of the filter substrate (1) are curved inside the first belt part (50) to bulge in the first direction.

(1-5) Second Belt Part

Figure 4:
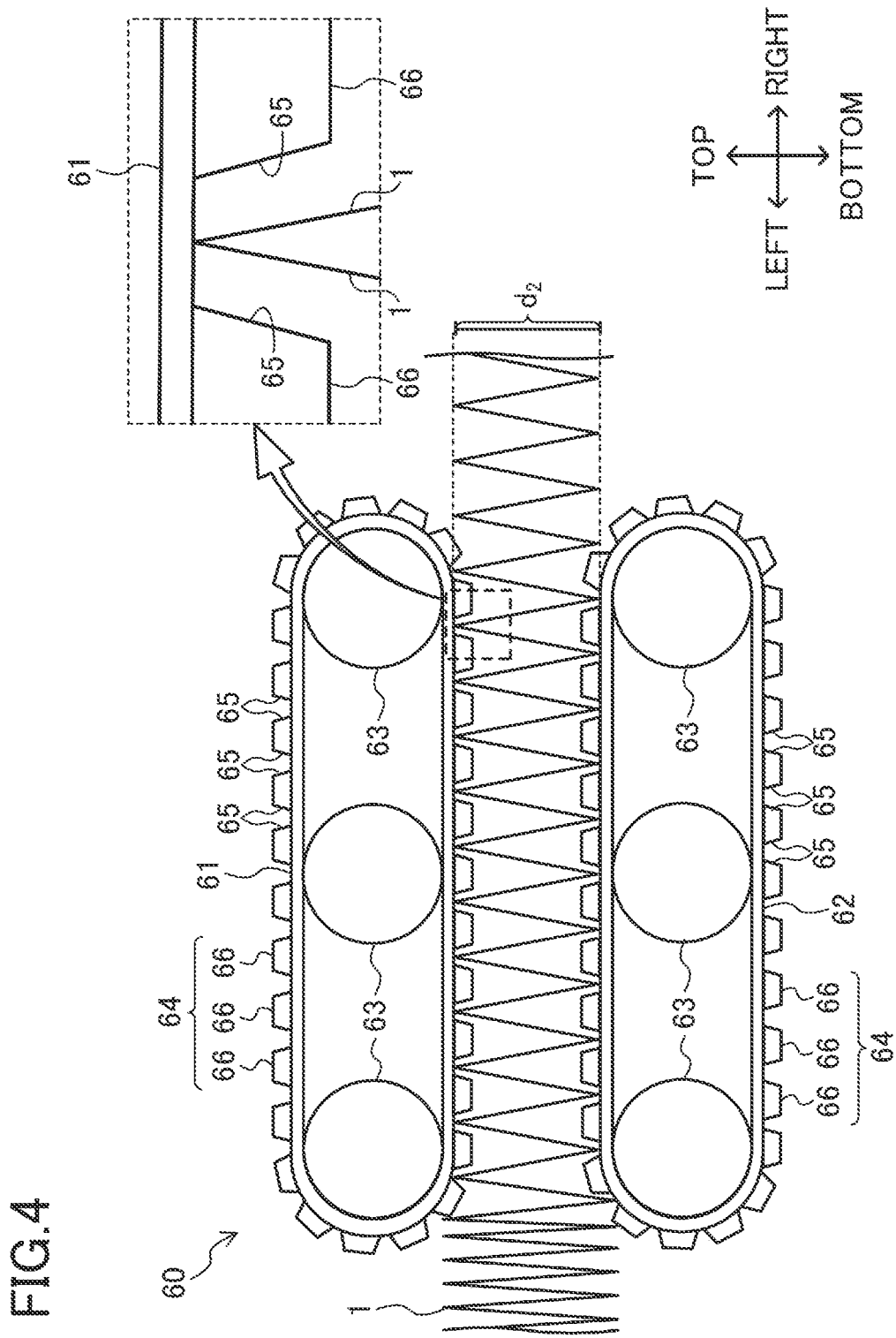
FIG. 4 illustrates how a second belt part forms pitches on the filter substrate.

As illustrated in FIGS. 1 and 4, the second belt part (60) is disposed downstream of the first belt part (50) in the first direction. The second belt part (60) pulls the mountains and valleys of the filter substrate (1) in the first direction to form a predetermined pitch between each adjacent pair of the mountains or between each adjacent pair of the valleys. The details will be described below.

The second belt part (60) includes a pair of belts (61, 62). The second belt part (60) includes a second upper belt (61) and a second lower belt (62). The second upper belt (61) and the second lower belt (62) are arranged in a line in the top-to-bottom direction such that their traveling surfaces face each other. The distance $d_2$ between the traveling surface of the second upper belt (61) and the traveling surface of the second lower belt (62) is generally equal to the distance $d_1$. In the following description, the inside of the second belt part (60) refers to a space between the second upper belt (61) and the second lower belt (62).

The second upper belt (61) and the second lower belt (62) are configured as elastic members of a resin or any other similar material. The second upper belt (61) and the second lower belt (62) have an annular shape. A plurality of second drive shafts (63) with an axis extending in the front-to-back direction of the plane of the paper of FIG. 4 is provided inside each of the second upper belt (61) and the second lower belt (62).

The second drive shafts (63) allow the traveling surfaces of the second upper belt (61) and the second lower belt (62) facing each other to travel in the first direction. The second drive shafts (63) are driven so that the traveling surfaces of the second upper belt (61) and the second lower belt (62) travel at the same traveling speed. The rotational speed of each second drive shaft (63) is higher than the rotational speed of each first drive shaft (53).

Next, how the pitch of the filter substrate (1) is formed will be described. The pitch is the distance between each adjacent pair of the mountains or between each adjacent pair of the valleys.

Figure 5:
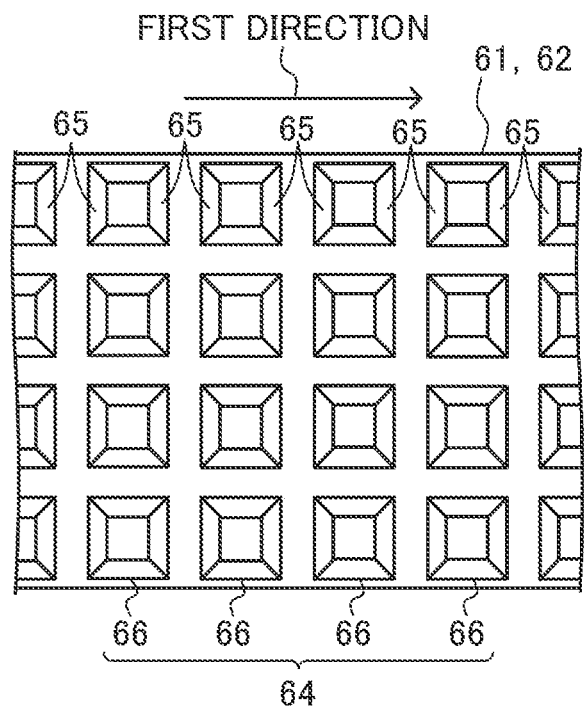
FIG. 5 illustrates a catching mechanism as viewed from the front of a traveling surface of the second belt part.

As illustrated in FIGS. 4 and 5, the traveling surfaces of the second belt part (60) are each provided with a catching mechanism (64) that catches the mountains and valleys of the filter substrate (1). The catching mechanism (64) of this embodiment is provided on the traveling surfaces of the second belt part (60), and includes projections and depressions alternately and successively formed in the first direction.

Specifically, the catching mechanism (64) includes a plurality of projections (66) generally in the shape of a square pyramid. The projections (66) are successively provided on the traveling surfaces of the second belt part (60) in the first direction and in a direction orthogonal to the first direction.

The catching mechanism (64) has taper surfaces (65) formed along the oblique surfaces of the mountains or valleys of the filter substrate (1). The oblique surfaces of the mountains or valleys of the filter substrate (1) are filter surfaces inclined from the crests a of the mountains to the troughs b of the valleys. The taper surfaces (65) are pyramidal surfaces (side surfaces) of the projections (66) arranged in the first direction. The taper surfaces (65) for the first upper belt (61) and the taper surfaces (65) for the second lower belt (62) form equal angles with respect to the vertical direction.

Here, the rotational speed of each second drive shaft (63) is higher than the rotational speed of each first drive shaft (53). Thus, the traveling speed of the traveling surface of the second belt part (60) is higher than the traveling speed of the first belt part (50). For this reason, if the filter substrate (1) ejected from the first belt part (50) enters the second belt part (60), the mountains and valleys of the filter substrate (1) are pulled in the first direction by the catching mechanism (64). This leads increase in the distances between each adjacent pair of the crests a of the mountains and between each adjacent pair of the troughs b of the valleys, resulting in the formation of a predetermined pitch.

The rotational speed of the second drive shafts (63) is controlled by a second control unit (200) to be described later. Specifically, increasing the rotational speed of the second drive shafts (63) leads to an increase in the traveling speed of the second belt part (60). This allows a pleated filter with a greater pitch to be manufactured. In contrast, lowering the rotational speed of the second drive shaft (63) leads to a decrease in the traveling speed of the second belt part (60). This allows a pleated filter with a smaller pitch to be manufactured. As can be seen, regulating the traveling speed of the second belt part (60) enables manufacturing of a pleated filter with an intended pitch.

(1-6) First Sensor And Second Sensor

As illustrated in FIG. 1, the first sensor (70) is disposed downstream of the star gears (40) and upstream of the first belt part (50). The first sensor (70) senses the state of the filter substrate (1) that is about to enter the first belt part (50). The first sensor (70) of this embodiment is an image sensor. The first sensor (70) captures an image of a portion of the filter substrate (1) that is about to enter the first belt part (50), and transmits the resultant image data to the second control unit (200) to be described later. The image data is used for a first feedback control to be described later.

The second sensor (80) is disposed downstream of the second belt part (60). The second sensor (80) senses the state of the filter substrate (1) that has just been ejected from the second belt part (60) in the first direction. The second sensor (80) of this embodiment is an image sensor. The second sensor (80) captures an image of a portion of the filter substrate (1) that has just been ejected from the second belt part (60) in the first direction, and transmits the resultant image data to the second control unit (200) to be described later. The image data is used for a second feedback control to be described later.

(1-7) Second Control Unit

Figure 6:
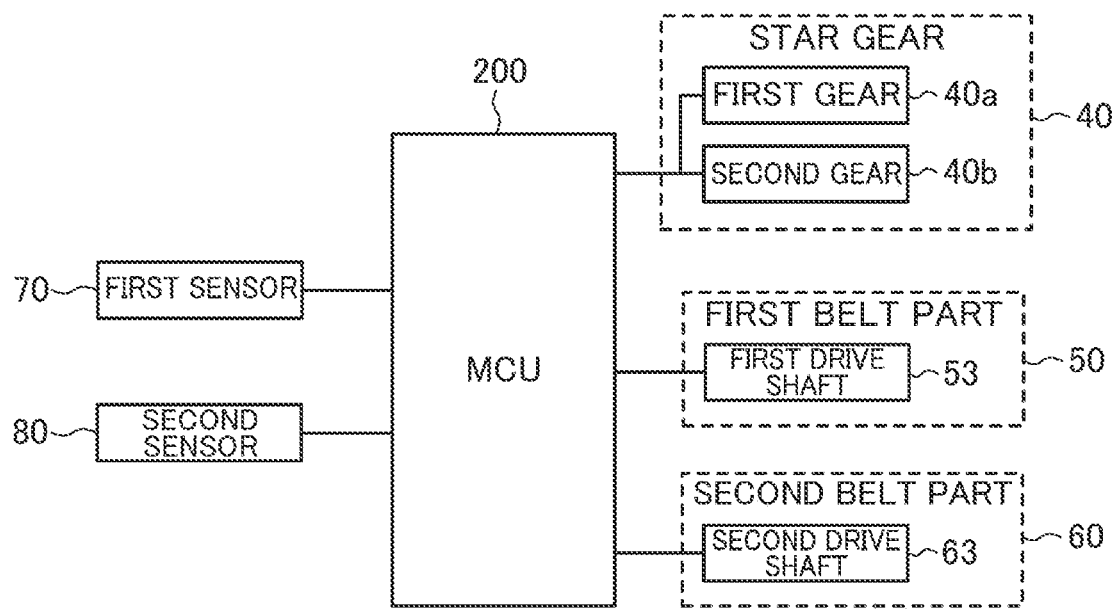
FIG. 6 is a block diagram illustrating the relationship between a second control unit and various components.

As shown in FIG. 6, the filter manufacturing apparatus (10) includes the second control unit (200). The second control unit (200) is an example of a control unit (200). The second control unit (200) includes a micro control unit (MCU), an electric circuit, and an electronic circuit. The MCU includes a central processing unit (CPU), a memory, and a communications interface. The memory stores various programs to be executed by the CPU. The second control unit (200) controls various components of the filter manufacturing apparatus (10). The details will be described below.

(1-7-1) Control of Star Gear

Based on the amount of pleats of the filter substrate (1) that is yet to enter the first belt part (50), the control unit (200) increases a rotational speed of the pair of gears (40) to make the amount of the pleats larger, and the control unit (200) lowers the rotational speed of the pair of gears (40) to make the amount of the pleats smaller.

Figure 9A:
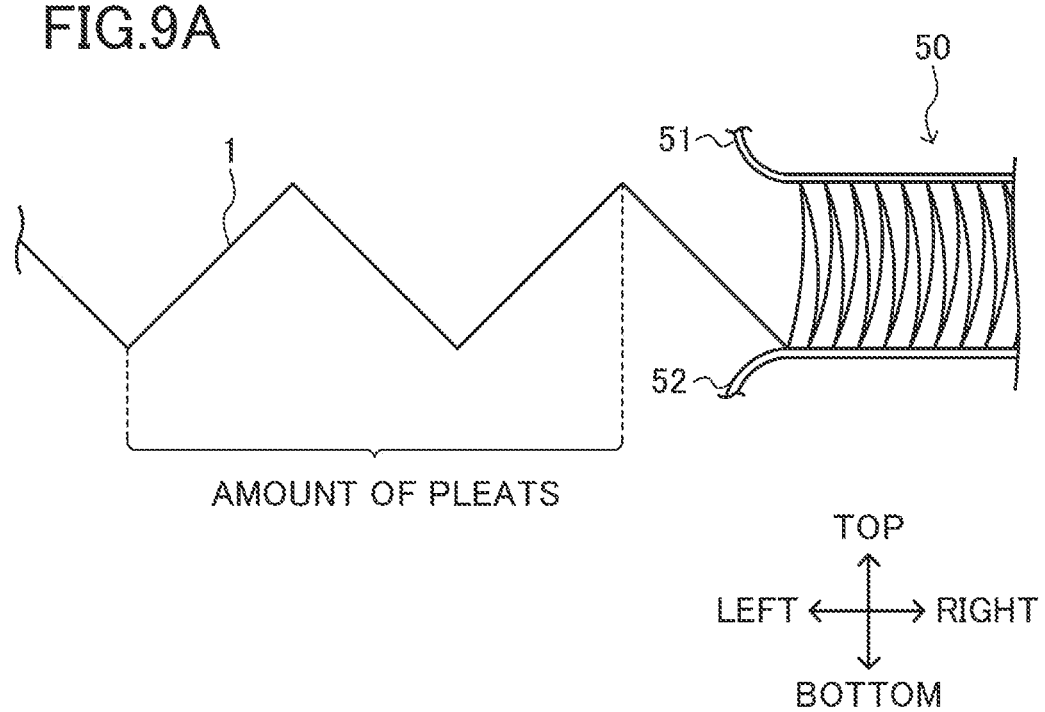
FIG. 9A illustrates the state of the filter substrate observed if the rotational speed of star gears is lowered.
Figure 9B:
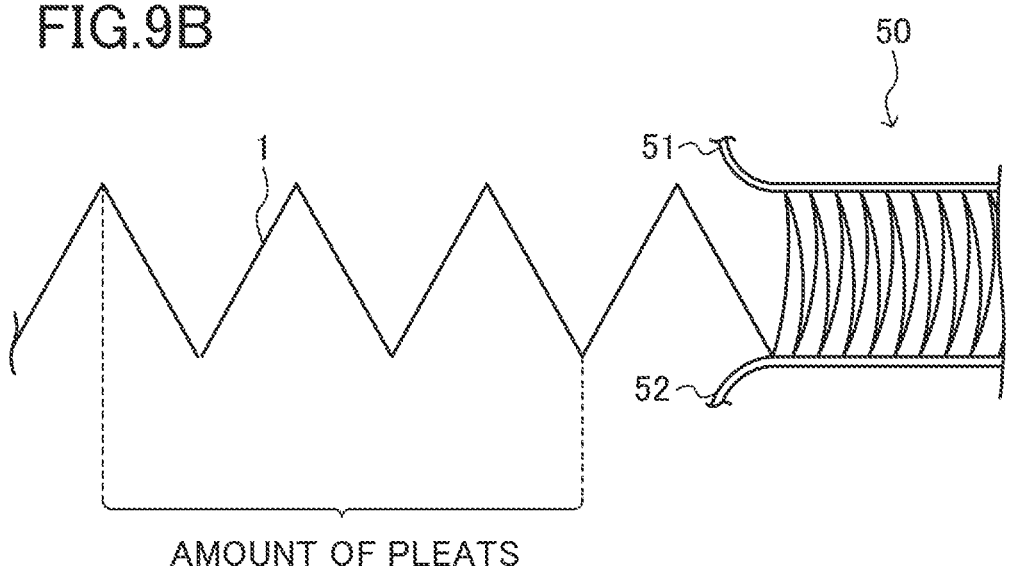
FIG. 9B illustrates the state of the filter substrate observed if the rotational speed of the star gears is increased.

Specifically, the second control unit (200) regulates the rotational speed of the star gears (40) based on the image data received from the first sensor (70) so that the amount of the pleats of the filter substrate (1) to be supplied to the first belt part (50) falls within its reference range. The reference range refers to an acceptable range around a reference value (e.g., an error range). The same applies hereinafter. The amount of the pleats refers to the number of the mountains and valleys of the filter substrate (1) (see FIGS. 9A and 9B). FIG. 9A and FIG. 9B illustrate how the amount of pleats is adjusted by the first feedback control. As can be seen, the second control unit (200) performs the first feedback control to control the rotational speed of the star gears (40), based on the amount of the pleats. The first feedback control will be described in detail later.

(1-7-2) Control of First Belt Part

The second control unit (200) controls the first drive shafts (53) to rotate at a constant rotational speed. This allows the traveling speed of each belt (51, 52) of the first belt part (50) to be kept constant.

(1-7-3) Control of Second Belt Part

Based on the state of a pitch of the filter substrate (1) that has passed through the second belt part (60), the second control unit (200) lowers the traveling speed of the second belt part (60) to make the pitch smaller, and increases the traveling speed of the second belt part (60) to make the pitch greater.

Specifically, the second control unit (200) regulates the rotational speed of the second drive shafts (63) based on the image data received from the second sensor (80) so that the pitch to be formed inside the second belt part (60) falls within its reference range. As can be seen, the second control unit (200) performs a second feedback control to control the traveling speed of the second belt part (60), based on the state of the pitch between each adjacent pair of the pleats. The second feedback control will be described in detail later.

Figure 7:
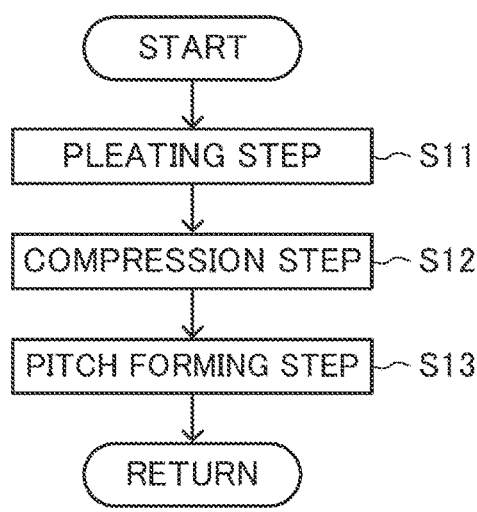
FIG. 7 is a flowchart showing a method for manufacturing a filter.

(2) Operation of Filter Manufacturing Apparatus (2-1) Method For Manufacturing Filter An example of a method for manufacturing a filter according to this embodiment will be described with reference to FIG. 7. The method for manufacturing a filter according to this embodiment includes the first feedback control, the second feedback control, and a tension control. Before operation of the filter manufacturing apparatus (10), one end of the filter substrate (1) is fed from the supply roll (20) by the operator's handling. Then, the filter substrate (1) is inserted between the star gears (40) via the uncoiler unit (30).

In step S11, the second control unit (200) performs a pleating step. The pleating step is intended to deliver the filter substrate (1) in the first direction and to successively fold the filter substrate (1) into alternate mountains and valleys. Specifically, in the pleating step, the second control unit (200) rotates the star gears (40) to pleat the filter substrate (1).

In step S12, the second control unit (200) performs a compressing step. The compressing step is intended to compress the mountains and valleys of the pleated filter substrate (1) in the first direction. Specifically, the second control unit (200) keeps the rotational speed of the first drive shafts (53) constant so that the traveling speed of the first belt part (50) is lower than the speed at which the filter substrate (1) enters the first belt part (50).

In step S13, the second control unit (200) performs a pitch forming step. The pitch forming step is intended to regulate the pitch between each adjacent pair of the mountains or valleys of the filter substrate (1) by controlling the speed at which the compressed filter substrate (1) is pulled. Specifically, the second control unit (200) controls the traveling speed of the second belt part (60) (the rotational speed of the second drive shafts (63)) so that the pitch falls within its reference range.

For example, if, after manufacturing of a filter with a first pitch (hereinafter referred to as the "first filter"), a filter with a second pitch greater than the first pitch (hereinafter referred to as the "second filter") is manufactured, the second control unit (200) increases the traveling speed of the second belt part (60) to a speed adapted to the second pitch. As a result, the first pitch is changed to the second pitch, and the manufacturing of a first filter is switched to the manufacturing of a second filter. Likewise, if, after manufacturing of a second filter, a first filter is manufactured, the second control unit (200) lowers the traveling speed of the second belt part (60) to a speed adapted to the first pitch. As a result, the second pitch is changed to the first pitch, and the manufacturing of a second filter is switched to the manufacturing of a first filter.

(2-2) First Feedback Control

Figure 8:
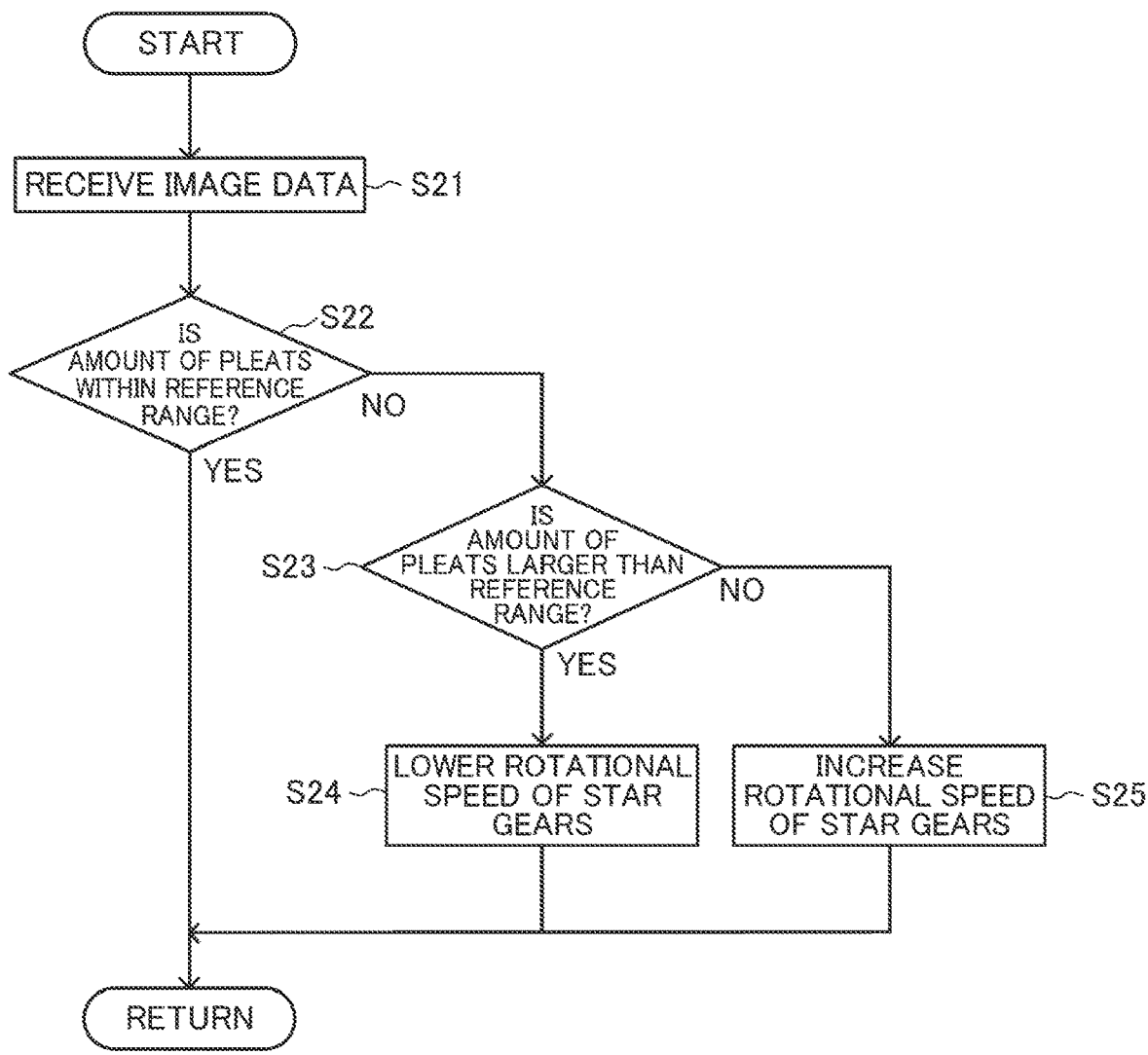
FIG. 8 is a flowchart showing a first feedback control.

The first feedback control is always performed during operation of the filter manufacturing apparatus (10). The details will be described with reference to FIGS. 8 and 9.

In step S21, the second control unit (200) receives image data on the filter substrate (1) from the first sensor (70).

In step S22, the second control unit (200) determines whether or not the amount of pleats of the filter substrate (1) is within its reference range, based on the image data. If a determination is made that the amount of the pleats is within the reference range (YES in step S22), the process returns to step S21 again. If a determination is made that the amount of the pleats is not within the reference range (NO in step S22), step S23 is performed.

In step S23, the second control unit (200) determines whether or not the amount of the pleats is larger than its reference range. If a determination is made that the amount of the pleats is larger than the reference range (YES in step S23), the process proceeds to step S24. If a determination is made that the amount of the pleats is not larger than the reference range (NO in step S23), the amount of the pleats is estimated to be smaller than the reference range, and step S25 is performed.

In step S24, the second control unit (200) lowers the rotational speed of the star gears (40) so that the amount of the pleats falls within its reference range. This can limit the speed at which the filter substrate (1) travels in the first direction, and can also limit the speed at which the filter substrate (1) enters the first belt part (50). As a result, a reduction in the amount of the pleats keeps the amount of compression of the mountains and valleys of the filter substrate (1) inside the first belt part (50) from being excessive, thereby regulating the amount of compression to a moderate amount (see FIG. 9A). The amount of compression means the amount of the pleats compressed by the first belt part (50) or the amount of the pleats inside the first belt part (50).

In step S25, the second control unit (200) increases the rotational speed of the star gears (40) so that the amount of the pleats falls within the reference range. This can increase the speed at which the filter substrate (1) travels in the first direction, and can also increase the speed at which the filter substrate (1) enters the first belt part (50). As a result, an increase in the amount of the pleats reduces uneven compression resulting from inadequate compression of the mountains and valleys of the filter substrate (1) inside the first belt part (50), thereby regulating the amount of compression to a moderate amount (see FIG. 9B).

(2-3) Second Feedback Control

The second feedback control is always performed during operation of the filter manufacturing apparatus (10). The details will be described with reference to FIG. 10.

In step S31, the second control unit (200) receives image data on the filter substrate (1) from the second sensor (80).

In step S32, the second control unit (200) determines whether or not the pitch between each adjacent pair of the pleats is within its reference range, based on the image data. If a determination is made that the pitch is within the reference range (YES in step S32), the process returns to step S31 again. If a determination is made that the pitch is not within the reference range (NO in step S32), step S33 is performed.

In step S33, the second control unit (200) determines whether or not the pitch is greater than the reference range. If a determination is made that the pitch is greater than the reference range (YES in step S33), step S34 is performed. If a determination is made that the pitch is not greater than the reference range (NO in step S33), the pitch is estimated to be less than the reference range, and step S35 is performed.

In step S34, the second control unit (200) lowers the rotational speed of the second drive shafts (63) so that the pitch falls within the reference range. This lowers the traveling speed of the second belt part (60) to limit the speed at which the catching mechanism (64) pulls the mountains and valleys of the filter substrate (1) ejected from the first belt part (50). As a result, the length of the pitch formed inside the second belt part (60) also decreases, so that the pitch falls within the reference range.

In step S35, the second control unit (200) increases the rotational speed of the second drive shafts (63) so that the pitch falls within the reference range. This increases the traveling speed of the second belt part (60) to increase the speed at which the catching mechanism (64) pulls the mountains and valleys of the filter substrate (1) ejected from the first belt part (50). As a result, the length of the pitch formed in the second belt part (60) increases, so that the pitch falls within the reference range.

(2-4) Tension Control

Figure 11:
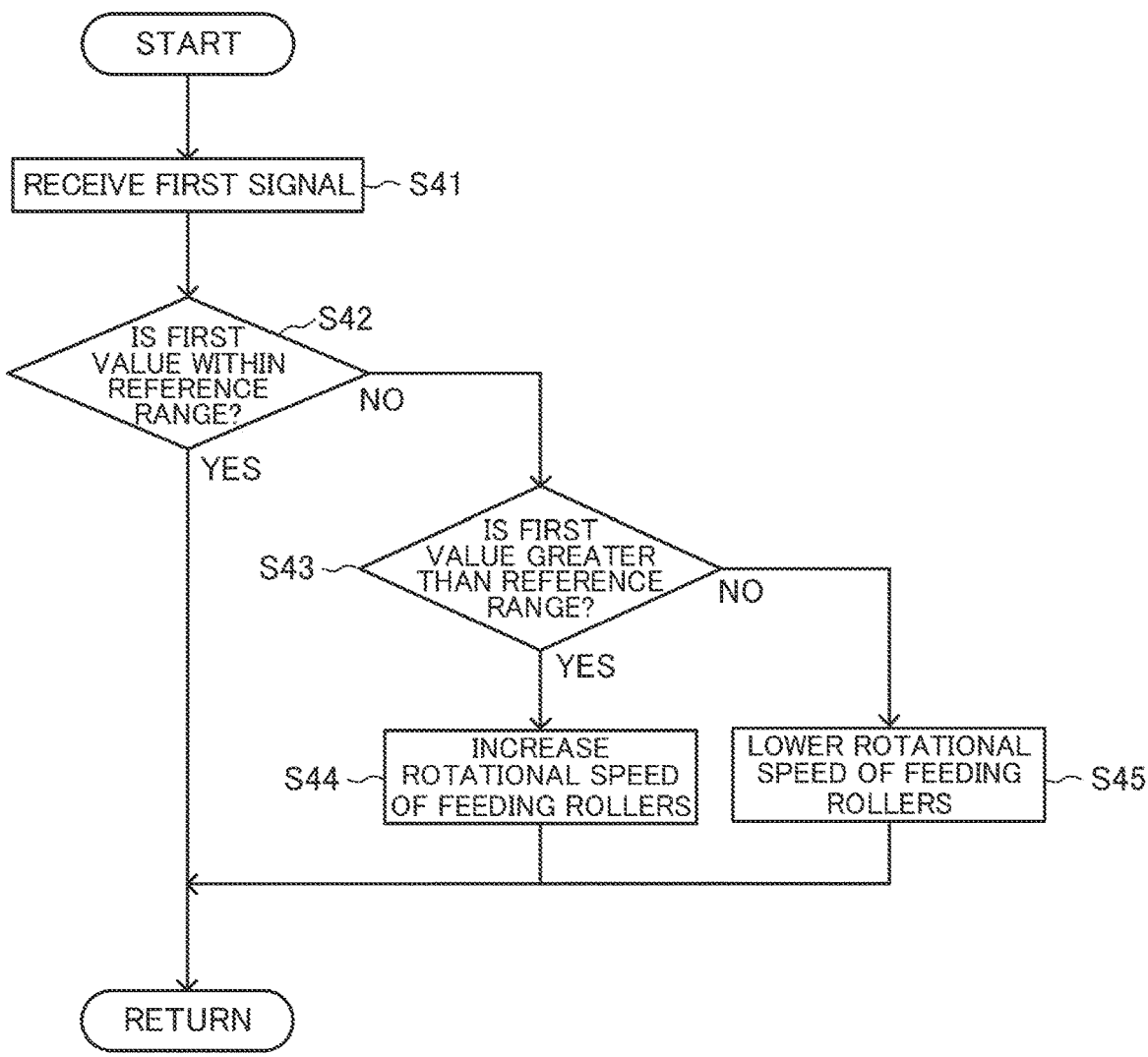
FIG. 11 is a flowchart showing a tension control.
Figure 12:
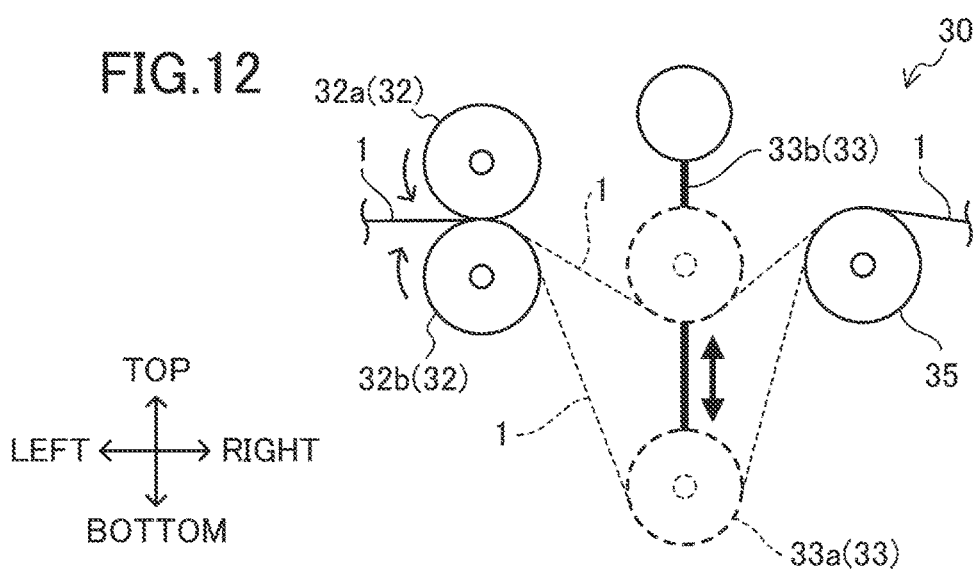
FIG. 12 illustrates motions of a dancer roller under the tension control.

The tension control is always performed during operation of the filter manufacturing apparatus (10). The details will be described with reference to FIGS. 11 and 12.

In step S41, the first control unit (100) receives a first signal indicating the height position of the filter substrate (1) from the position sensor (36).

In step S42, the first control unit (100) determines whether or not a first value indicating the height position of the filter substrate (1) is within its reference range, based on the first signal. The reference range means a range of height positions including a reference position. If a determination is made that the first value is within the reference range (YES in step S42), the process returns to step S41 again. If a determination is made that the first value is not within the reference range (NO in step S42), step S43 is performed.

In step S43, the first control unit (100) determines whether or not the first value is greater than the reference range. Here, a state where the first value is greater than the reference range refers to a state where the height position of the third roller (33a) is higher than the reference position. In this state, the tension of the filter substrate (1) is relatively high. If a determination is made that the first value is greater than the reference range (YES in step S43), step S44 is performed. If a determination is made that the first value is not greater than the reference range (NO in step S43), the first value is estimated to be less than the reference range, and step S45 is performed. A state where the first value is less than the reference range refers to a state where the height position of the third roller (33a) is lower than the reference position. In this state, the tension of the filter substrate (1) is relatively low.

In step S44, the first control unit (100) increases the rotational speed of the rollers (32a, 32b) serving as the feeding rollers (32) so that the first value falls within the reference range. This makes the third roller (33a) move downward to the reference position (see FIG. 12), and makes the tension of the filter substrate (1) lowered. As a result, the tension of the filter substrate (1) is kept constant.

In step S45, the first control unit (100) lowers the rotational speed of the rollers (32a, 32b) serving as the feeding rollers (32) so that the first value falls within the reference range. This makes the third roller (33a) move upward to the reference position (see FIG. 12), and makes the tension of the filter substrate (1) increased. As a result, the tension of the filter substrate (1) is kept constant.

(3) Features (3-1) Feature 1

In the filter manufacturing apparatus (10) according to this embodiment, the control unit (200) controls the traveling speed of the second belt part (60). As can be seen, simply regulating the traveling speed of the second belt part (60) enables regulation of the pitch. As a result, a pleated filter with an intended pitch can be manufactured.

In particular, in a filter manufacturing apparatus (10) including a first belt part (50) and a second belt part (60) as in this embodiment, the positions of two belts (61, 62) of the second belt part (60) have typically had to be changed in accordance with the pitch. Specifically, shortening the distance d 2 between the second upper belt (61) and the second lower belt (62) can make the pitch relatively narrow, whereas in this case, the position of at least one of the second upper belt (61) or the second lower belt (62) has to be changed to regulate the height of the at least one of these belts. However, according to this embodiment, making the traveling speed of the second belt part (60) variable can eliminate the need for such a task. This can eliminate the task of changing the positions of the belts (61, 62), and can enhance the efficiency of manufacturing a filter.

(3-2) Feature 2

In the filter manufacturing apparatus (10) of this embodiment, based on a state of a pitch of the filter substrate (1) that has passed through the second belt part (60), the second control unit (200) lowers the traveling speed of the second belt part (60) to make the pitch smaller, and increases the traveling speed of the second belt part (60) to make the pitch greater.

According to this embodiment, the control unit (200) performing the second feedback control can regulate the traveling speed of the second belt part (60) so that the pitch falls within the reference range. As can be seen, controlling the traveling speed of the second belt part (60) based on pitch information can reduce variations in the pitch, and can provide a constant pitch. Thus, a pleated filter with a constant pitch can be manufactured.

In addition, the constant pitch can improve the design for the pleated filter. Nonuniform pitches degrade the performance of the filter. However, this embodiment hinders such degradation in the performance, thus achieving the original filter performance.

(3-3) Feature 3

In the filter manufacturing apparatus (10) of this embodiment, based on the amount of pleats of the filter substrate (1) that is yet to enter the first belt part (50), the control unit (200) increases a rotational speed of the pair of gears (40) to make the amount of the pleats larger, and the control unit (200) lowers the rotational speed of the pair of gears (40) to make the amount of the pleats smaller.

According to this embodiment, the control unit (200) performing the first feedback control can uniformize the amount of the pleats of the filter substrate (1) to be supplied to the first belt part (50). Regulating the rotational speed of the star gears (40) based on information on the amount of the pleats as described above can reduce uneven compression where inadequately compressed pleats are formed inside the first belt part (50).

(3-4) Feature 4

In the filter manufacturing apparatus (10) of this embodiment, the catching mechanism (64) is provided on the traveling surfaces of the second belt part (60) to catch the mountains and valleys of the filter substrate (1).

According to this embodiment, the mountains and valleys of the filter substrate (1) compressed by the first belt part (50) are pulled in the first direction while being caught by the catching mechanism (64) of the second belt part (60). Since the mountains and valleys are retained by the catching mechanism (64) as described above, the pitch formation can be kept from being impaired. In addition, the mountains and valleys of the filter substrate (1) can be kept from sliding on the traveling surfaces of the second belt part (60), thereby reducing nonuniform pitches.

(3-5) Feature 5

The catching mechanism (64) of the filter manufacturing apparatus (10) of this embodiment is provided on the traveling surfaces of the second belt part (60), and includes projections and depressions alternately and successively formed in the first direction. Simply providing projections and depressions on the traveling surfaces of the second belt part (60) allows the catching mechanism (64) to be easily provided.

(3-6) Feature 6

The catching mechanism (64) of the filter manufacturing apparatus (10) of this embodiment has the taper surfaces (65) formed along the oblique surfaces of the mountains or valleys of the filter substrate (1).

The second belt part (60) pulls the filter substrate (1) so that the taper surfaces (65) of the catching mechanism (64) conform to the associated mountains and valleys of the filter substrate (1). This can keep the mountains and valleys from being damaged, and enables stable pleating.

(3-7) Feature 7

The filter manufacturing apparatus (10) of this embodiment is provided with the uncoiler unit (30) (adjuster) disposed upstream of the star gears (40) to adjust the tension of the filter substrate (1).

According to this embodiment, the stabilized tension of the filter substrate (1) enables supply of the filter substrate (1) to the star gears (40) without loosening the filter substrate (1). Thus, the star gears (40) can keep the lengths from the crests of the mountains to the adjacent troughs of the valleys of the filter substrate (1) (the lengths of the oblique sides of the mountains or valleys) from being nonuniform.

(4) Variation

Figure 13:
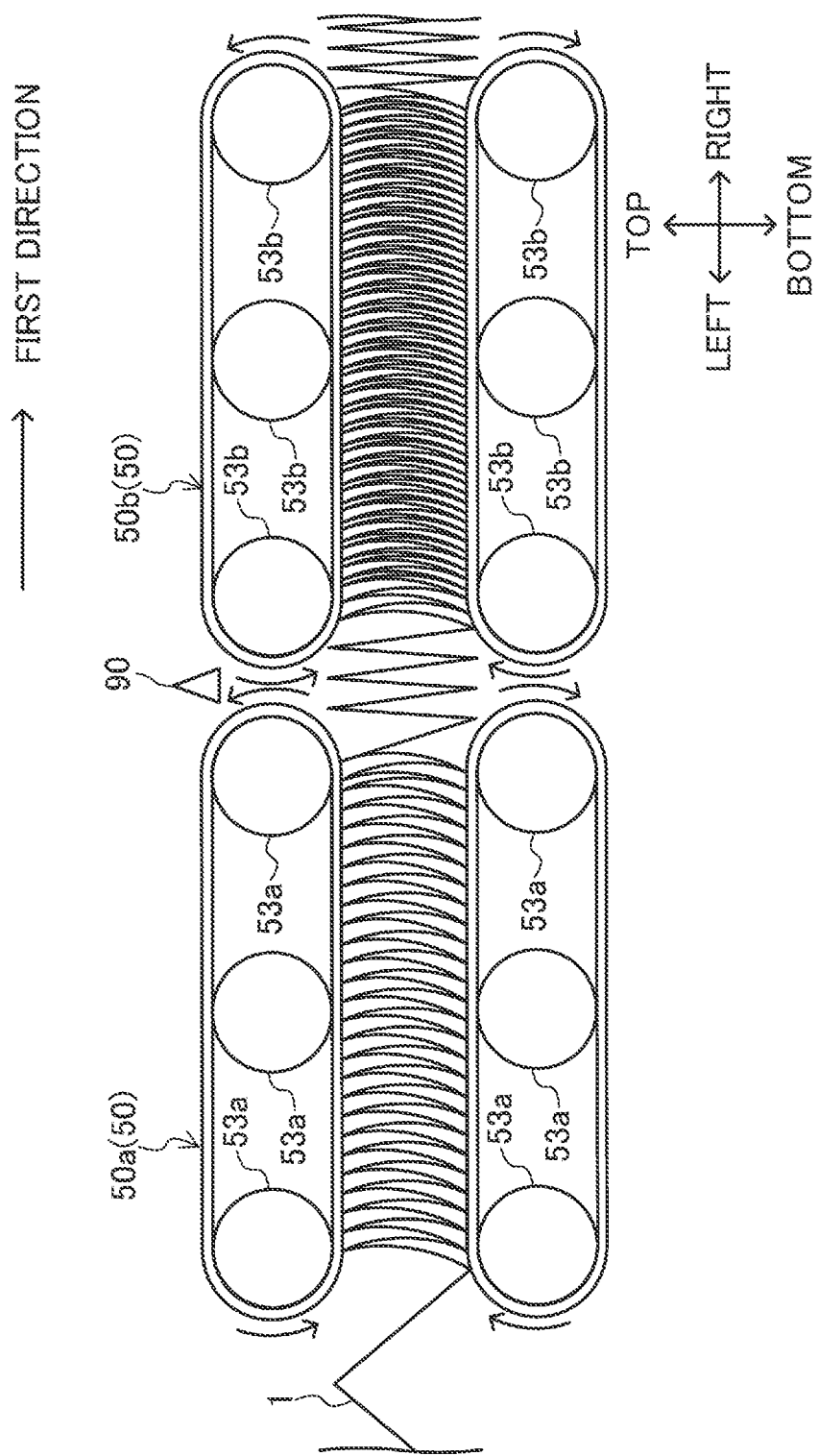
FIG. 13 illustrates how a first belt part according to a variation compresses a filter substrate, and corresponds to FIG. 3.

A variation of the filter manufacturing apparatus (10) will be described with reference to FIG. 13. A configuration different from that of the foregoing embodiment will now be described. A first belt part (50) of a filter manufacturing apparatus (10) of this variation includes a first upstream belt part (50*a*) and a first downstream belt part (50*b*).

(4-1) First Upstream Belt Part and First Downstream Belt Part

The configuration of each of the first upstream belt part (50*a*) and the first downstream belt part (50*b*) is identical to that of the first belt part (50) of the foregoing embodiment. The first upstream belt part (50*a*) and the first downstream belt part (50*b*) are adjacent to each other in the first direction. The first upstream belt part (50*a*) is disposed upstream of the first downstream belt part (50*b*) in the first direction. The first upstream belt part (50*a*) is disposed downstream of star gears (40) in the first direction.

The first upstream belt part (50*a*) includes a plurality of first upstream drive shafts (53*a*). The first upstream drive shafts (53*a*) allow a first upper belt and a first lower belt of the first upstream belt part (50*a*) to travel. The first downstream belt part (50*b*) includes a plurality of first downstream drive shafts (53*b*). The first downstream drive shafts (53*b*) allow a first upper belt and a first lower belt of the first downstream belt part (50*b*) to travel. The first upstream drive shafts (53*a*) and the first downstream drive shafts (53*b*) correspond to the first drive shafts (53) of the foregoing embodiment. The rotational speeds of the first upstream drive shafts (53*a*) and first downstream drive shafts (53*b*) are individually controlled by a second control unit (200).

(4-2) Third Sensor

The filter manufacturing apparatus (10) of the variation includes a third sensor (90). The third sensor (90) is disposed between the first upstream belt part (50*a*) and the first downstream belt part (50*b*). The third sensor (90) senses the state of the filter substrate (1) ejected from the first upstream belt part (50*a*). In other words, the third sensor (90) senses the state of the filter substrate (1) that is about to enter the first downstream belt part (50*b*).

The third sensor (90) of this variation is an image sensor. The third sensor (90) captures an image of the filter substrate (1) that is being transferred between the first upstream belt part (50*a*) and the first downstream belt part (50*b*), and transmits the resultant image data to the second control unit (200). The image data is used for a third feedback control to be described later.

(4-3) Control of First Upstream Belt Part and First Downstream Belt Part

The second control unit (200) makes the traveling speed of the first upstream belt part (50*a*) higher than that of the first downstream belt part (50*b*). Specifically, the second control unit (200) controls the rotational speed of the first downstream drive shafts (53*b*) so that the rotational speed of the first downstream drive shafts (53*b*) is constant. The second control unit (200) controls the rotational speed of the first upstream drive shafts (53*a*) so that the rotational speed of the first upstream drive shafts (53*a*) is higher than that of the first downstream drive shafts (53*b*). The second control unit (200) controls the rotational speed of the first upstream drive shafts (53*a*) so that the rotational speed of the first upstream drive shafts (53*a*) is lower than that of the star gears (40).

Thus, the filter substrate (1) transferred from the star gears (40) is compressed by the first upstream belt part (50*a*). The filter substrate (1) compressed by the first upstream belt part (50*a*) is further compressed by the first downstream belt part (50*b*). Specifically, the traveling speed of the first upstream belt part (50*a*) is lower than the rotational speed of the star gears (40). That is to say, the speed of the filter substrate (1) entering the first upstream belt part (50*a*) is higher than the speed of the filter substrate (1) moving through the first upstream belt part (50*a*). Thus, if the pleats (mountains or valleys) of the filter substrate (1) come into contact with the upstream end of the first upstream belt part (50*a*), the filter substrate (1) undergoes a first compression. This first compression occurs from the upstream end of the first upstream belt part (50*a*) to the star gears (40). The filter substrate (1) compressed through the first compression is transferred through the first upstream belt part (50*a*) toward the first downstream belt part (50*b*) with the constant pitch maintained.

Next, the traveling speed of the first downstream belt part (50*b*) is lower than that of the first upstream belt part (50*a*). That is to say, the speed of the filter substrate (1) entering the first downstream belt part (50*b*) is higher than the speed of the filter substrate (1) moving through the first downstream belt part (50*b*). Thus, if the pleats (mountains or valleys) of the filter substrate (1) come into contact with the upstream end of the first downstream belt part (50*b*), the filter substrate (1) undergoes a second compression. This second compression occurs from the upstream end of the first downstream belt part (50*b*) to the downstream end of the first upstream belt part (50*a*). The filter substrate (1) compressed through the second compression is transferred through the first downstream belt part (50*b*) toward a second belt part (60) with the constant pitch maintained. The force at which the filter substrate (1) is compressed through the second compression is higher than that through the first compression. Thus, the pitch of the filter substrate (1) formed by the first downstream belt part (50*b*) is smaller than that of the filter substrate (1) formed by the first upstream belt part (50*a*).

(4-4) Third Feedback Control

The second control unit (200) performs a third feedback control. Specifically, the second control unit (200) measures a first value indicating the number of the mountains or valleys of the filter substrate (1) that have passed through the first upstream belt part (50*a*) for a predetermined period, based on image data output from the third sensor (90). The second control unit (200) controls the traveling speed of the first upstream belt part (50*a*) based on the first value. The first value may be any value that indicates the number of the mountains or valleys of the filter substrate (1) for the predetermined period. In this variation, the first value is the number of the mountains or valleys of the filter substrate (1) for the predetermined period. The third feedback control will now be described with reference to FIG. 14.

In step S51, the second control unit (200) receives image data on the filter substrate (1) from the third sensor (90).

In step S52, the second control unit (200) determines whether or not the number of the mountains or valleys of the filter substrate (1) is within its reference range, based on the image data. If a determination is made that the number of the mountains or valleys is within the reference range (YES in step S52), the process returns to step S51 again. If a determination is made that the number of the mountains or valleys is not within the reference range (NO in step S52), step S53 is performed.

In step S53, the second control unit (200) determines whether or not the number of the mountains or valleys is greater than the reference range. If a determination is made that the number of the mountains or valleys is greater than the reference range (YES in step S53), the process proceeds to step S54. If a determination is made that the number of the mountains or valleys is not greater than the reference range (NO in step S53), the number of the mountains or valleys is estimated to be less than the reference range, and step S55 is performed.

In step S54, the second control unit (200) lowers the rotational speed of the first upstream drive shafts (53*a*) so that the number of the mountains or valleys falls within the reference range. This can limit the speed at which the filter substrate (1) travels in the first direction, and can also limit the speed at which the filter substrate (1) enters the inside of the first downstream belt part (50*b*). This reduces the number of the mountains or valleys. The second control unit (200) controls the rotational speed of the first upstream drive shafts (53*a*) so that the rotational speed of the first upstream drive shafts (53*a*) is not below the rotational speed of the first downstream drive shafts (53*b*).

In step S55, the second control unit (200) increases the rotational speed of the first upstream drive shafts (53*a*) so that the number of the mountains or valleys falls within the reference range. This can increase the speed at which the filter substrate (1) travels in the first direction, and can also increase the speed at which the filter substrate (1) enters the inside of the first downstream belt part (50*b*). This increases the number of the mountains or valleys. The second control unit (200) controls the rotational speed of the first upstream drive shafts (53*a*) so that the rotational speed of the first upstream drive shafts (53*a*) is not above the rotational speed of the star gears (40).

Here, the rotational speed of the star gears (40) made higher than the traveling speed of the first belt part (50) in the filter manufacturing apparatus (10) of the foregoing embodiment allows a pressure to be applied to the filter substrate (1) in the first direction. The filter substrate (1) is compressed by this pressure and then transferred through the first belt part (50). At the same time, a reaction force (stress) to this pressure is produced on the star gears (40). Specifically, while the star gears (40) attempt to feed the filter substrate (1) in the first direction, a force at which the filter substrate (1) attempts to return to the star gears (40) (a force at which the filter substrate (1) attempts to move in a direction opposite to the first direction) acts on the filter substrate (1). This force increases as the rotational speed of the star gears (40) becomes higher than the traveling speed of the first belt part (50). This force increased excessively prevents the star gears (40) from smoothly feeding the filter substrate (1) that has been interposed between the upper and lower gears (40a, 40b). This may bring problems associated with pleating.

To address such problems, in the filter manufacturing apparatus (10) of this variation, the first upstream belt part (50a) subjects the filter substrate (1) to the second compression before the first downstream belt part (50b) subjects the filter substrate (1) to the first compression. The force of the second compression is smaller than the force of the first compression. This can limit the force of the filter substrate (1) attempting to return to the star gears (40). This can reduce the problems associated with pleating. In other words, the difference between the traveling speed of the first upstream belt part (50a) and the rotational speed of the star gears (40) is smaller than the difference between the traveling speed of the first downstream belt part (50b) and the rotational speed of the star gears (40). Thus, in this variation, the force at which the filter substrate (1) attempts to return to the star gears (40) becomes smaller than if no first upstream belt part (50a) is provided (i.e., if only the first downstream belt part (50b) is provided). As can be seen, the first upstream belt part (50a) functions to buffer the force at which the filter substrate (1) attempts to return to the star gears (40).

In addition, the first upstream belt part (50a) can reduce the problems associated with pleating by the star gears (40). Thus, the traveling speed of the first downstream belt part (50b) does not have to be lowered. This can keep the manufacturing speed of a filter from decreasing.

OTHER EMBODIMENTS

The foregoing embodiment may also be configured as follows.

The pleats-forming unit (40) may be any unit that pleats the filter substrate (1), and is not limited to the star gears.

The second control unit (200) may include the first control unit (100). That is to say, the first control unit (100) and the second control unit (200) may be integrated together.

The first feedback control and the second feedback control do not have to be performed so that the amount of the pleats and the pitch fall within their respective reference ranges. In other words, the first feedback control and the second feedback control may be performed so that the amount of the pleats and the pitch are equal to their respective reference values.

The catching mechanism (64) may be any mechanism that catches the mountains and valleys of the filter substrate (1) ejected from the first belt part (50), and does not have to have projections and depressions.

If the catching mechanism (64) has projections and depressions, the catching mechanism (64) does not have to have taper surfaces (65). For example, the catching mechanism (64) may have curved surfaces.

The filter manufacturing apparatus (10) does not have to include the uncoiler unit (30).

While the embodiment and variations thereof have been described above, it will be understood that various changes in form and details may be made without departing from the spirit and scope of the claims. The foregoing embodiment and variations thereof may be combined or replaced with each other without deteriorating the intended functions of the present disclosure. The expressions of "first," "second," . . . described above are used to distinguish the terms to which these expressions are given, and do not limit the number and order of the terms.

As can be seen from the foregoing description, the present disclosure is useful for an apparatus and method for manufacturing a filter.

The invention claimed is:

1. An apparatus for manufacturing a filter, the apparatus comprising:
   a pleats-forming unit configured to deliver a filter substrate in a first direction and then to successively fold the filter substrate into alternate mountains and valleys;
   a first belt part disposed downstream of the pleats-forming unit in the first direction, the first belt part being configured to contact with the mountains and valleys of the filter substrate to compress the mountains and valleys of the filter substrate in the first direction;
   a second belt part disposed downstream of the first belt part in the first direction, a traveling surface of the second belt part being provided with a catching mechanism configured to catch the mountains and valleys of the filter substrate, the second belt part being configured to pull the mountains and valleys of the filter substrate in the first direction to form a predetermined pitch between each adjacent pair of the mountains or valleys; and
   a control unit configured to control a traveling speed of the second belt part to be higher than a traveling speed of the first belt part.

2. The apparatus of claim 1, wherein
   based on a state of a pitch of the filter substrate that has passed through the second belt part, the control unit is configured to
      lower the traveling speed of the second belt part to make the pitch smaller, and
      increase the traveling speed of the second belt part to make the pitch greater.

3. The apparatus of claim 2, wherein
   the pleats-forming unit is arranged to sandwich the filter substrate,
   the pleats-forming unit includes a pair of gears meshing with each other to form the mountains and valleys of the filter substrate, and
   based on the amount of pleats of the filter substrate that is yet to enter the first belt part, the control unit is configured to
      increase a rotational speed of the pair of gears to make the amount of the pleats larger, and
      lower the rotational speed of the pair of gears to make the amount of the pleats smaller.

4. The apparatus of claim 2 further comprising:
   an adjuster disposed upstream of the pleats-forming unit, the adjuster being configured to adjust a tension of the filter substrate.

5. The apparatus of claim 2, wherein
   the first belt part includes a first upstream belt part and a first downstream belt part that are adjacent to each other in the first direction, the first upstream belt part is disposed upstream of the first downstream belt part in the first direction, and the control unit is configured to make a traveling speed of the first upstream belt part higher than the first downstream belt part.

6. The apparatus of claim 5, wherein the control unit is configured to control the traveling speed of the first upstream belt part based on a first value indicating a number of the mountains or valleys of the filter substrate that have passed through the first upstream belt part during a predetermined period.

7. The apparatus of claim 1, wherein the pleats-forming unit is arranged to sandwich the filter substrate, the pleats-forming unit includes a pair of gears meshing with each other to form the mountains and valleys of the filter substrate, and based on the amount of pleats of the filter substrate that is yet to enter the first belt part, the control unit is configured to increase a rotational speed of the pair of gears to make the amount of the pleats larger, and lower the rotational speed of the pair of gears to make the amount of the pleats smaller.

8. The apparatus of claim 1, wherein the catching mechanism is provided on the traveling surface of the second belt part, and the catching mechanism includes projections and depressions alternately and successively formed in the first direction.

9. The apparatus of claim 8, wherein the catching mechanism has taper surfaces formed along oblique surfaces of the mountains or valleys of the filter substrate.

10. The apparatus of claim 1 further comprising:

an adjuster disposed upstream of the pleats-forming unit, the adjuster being configured to adjust a tension of the filter substrate.

11. The apparatus of claim 1, wherein the first belt part includes a first upstream belt part and a first downstream belt part that are adjacent to each other in the first direction, the first upstream belt part is disposed upstream of the first downstream belt part in the first direction, and the control unit is configured to make a traveling speed of the first upstream belt part higher than the first downstream belt part.

12. The apparatus of claim 11, wherein the control unit is configured to control the traveling speed of the first upstream belt part based on a first value indicating a number of the mountains or valleys of the filter substrate that have passed through the first upstream belt part during a predetermined period.

13. A method for manufacturing a filter, the method comprising:

forming pleats by delivering a filter substrate in a first direction and folding the filter substrate into alternate mountains and valleys;

using a first belt part to contact the mountains and valleys of the filter substrate having the pleats and compress the filter substrate in the first direction; and using a second belt part having a catching mechanism provided on a traveling surface thereof to pull the mountains and valleys of the filter substrate in the first direction so as to regulate a pitch between each adjacent pair of the mountains or valleys of the filter substrate, a traveling speed of the second belt part being controlled to be higher than a traveling speed of the first belt part.

* * * * *